CARRY OR BORROW SYSTEM FOR ARITHMETIC COMPUTATIONS

Filed June 7, 1966 3 Sheets-Sheet 1

INVENTOR.
ROBERT K. BOOHER

BY Robert D. Rogers

ATTORNEY

INVENTOR.
ROBERT K. BOOHER
BY Robert G Rogers
ATTORNEY

CARRY OR BORROW SYSTEM FOR ARITHMETIC COMPUTATIONS

Filed June 7, 1966 3 Sheets-Sheet 3

INVENTOR.
ROBERT K. BOOHER

BY Robert G Rogers
ATTORNEY

United States Patent Office 3,465,133
Patented Sept. 2, 1969

3,465,133
CARRY OR BORROW SYSTEM FOR ARITHMETIC COMPUTATIONS

Robert K. Booher, Downey, Calif., assignor to North American Rockwell Corporation, a corporation of Delaware Filed June 7, 1966, Ser. No. 555,717
Int. Cl. G06f 7/385, 7/42, 7/50
U.S. Cl. 235—175 2 Claims

ABSTRACT OF THE DISCLOSURE

The system includes gates which form logic groups comprising at least one logic order. Alternate logic groups receive operand information corresponding to a particular bit position and primed borrow or carry information from a preceding logic group for producing unprimed borrow or carry information. The other groups also receive operand information corresponding to those bit positions and the unprimed borrow or carry information from the alternate groups for producing the primes of the borrow or carry information.

This invention relates to a system for increasing propagation speed of carry or borrow information produced during arithmetic computations, and more particularly to a system for increasing propagation speed of carry or borrow information by producing the information with a single logic order or a group of orders as a function of the logical state of the operand bits involved in the computation.

Current systems for propagating carry digits in computations systems such as digital computers are based on methods previously used with logical designs embodying conventional diode AND and OR gates even though NAND and NOR gates are now being utilized in the design of carry systems. In particular, at a given logical order or level, a carry from a lower order is used together with the binary digits of a given order to generate a carry into the next higher order. Designs utilizing that technique require two levels of logic gates when NAND or NOR logic gates are used. If a computer has a word length of $n$ binary digits, the propagation delay is $2n$ times the transmission delay of one logic level because two levels of gates were used.

The term "one order, or level," denotes a gate which combines a plurality of inputs or combination of gates which logically combine inputs at approximately the same time so that the outputs are available at approximately the same time, without the need for passing through other gates. In other words, the delay between the inputs and the outputs for each gate of the combination is approximately the same. The gates may be said to be in a parallel combination because the inputs are being logically processed at approximately the same time. The term "two orders, or levels," indicates that the outputs from one order must be used as inputs to another order before the next outputs are available and therefore, an additional delay as well as an additional expense is incurred by using additional logical orders.

It is possible to generate all carries in parallel. However, since the carry of a given order is a function of binary digits of all the lower orders, the logical network required for parallel propagation expands at each higher order so that the parallel logic for simultaneous generation of carries is not practical or economically feasible.

In the sequential propagation of carries, a near minimum number of gates are required but since the carry $C_i$ of a given order $i$ is an explicit function of $C_{i-1}$, a maximum amount of propagation time is required. Improved systems representing a compromise between the parallel propagation systems and the sequential propagation systems, may be designed by mechanizing logic for propagating a carry as a function, for example, of only the relevant augend and addend digits and some lower order carry. In such systems, however, where a group of digits are processed in parallel with a carry into the group for generating a carry into the next group, there is required two levels of logic for each group to propagate carries.

The present invention provides an improved carry or borrow propagation system for use with arithmetic computational systems which reduces the orders of logic required to propagate carry or borrow information using gates of either the NAND or NOR type. The system includes logic means for producing, or forming, borrow or carry information in alternate groups and the primes of carry or borrow information in the remaining groups. A group is comprised of at least one logical order. The arithmetic computational means is responsive to the borrow or carry information and primes of the borrow or carry information. The means for forming the information, whether primed or not, are responsive to the borrow or carry information formed by a previous group and the operand bits of the particular group involved in forming the information.

Where carry or borrow information is processed over a plurality of orders comprising a group, carry or borrow information which should have been generated by previous orders in the group is, in effect, generated and becomes part of the information produced by the group as a function of the operand bits in the particular order involved.

In one order of a group, NAND or NOR gating means are included which not only pass previously formed information as a function of the operand bits but also generate new borrow or carry information at the same time, also as a function of the state of the operand bits of that particular order.

Carry information is formed by generating new carry bits and passing or not passing, as the case may be, previously formed information during an addition computation using the bits of augend and addend operands. Borrow information is similarly formed during a subtraction computation using the bits of minuend and subtrahend operands. Inasmuch as multiplication and division involve addition and subtraction, the system is applicable to those computations as well as the specific examples given.

Although the system described and shown herein uses NAND gates, NOR gates may be used in other embodiments.

Therefore, it is an object of this invention to provide a carry or borrow system for increasing the speed of carry or borrow information propagation.

It is another object of this invention to provide a carry mechanization scheme for reducing the logic required to process carry or borrow information from one order to another order or from one group of orders to a subsequent group.

It is still a further object of this invention to provide a system for propagating carry or borrow information by using the complement of alternate carries or borrows with other operand information to generate new carry or borrow information and to pass previously formed carry or borrow information.

It is still a further object of this invention to generate the complements of a first plurality of carries or borrows simultaneously and using one of said pluralities with a plurality of either augend and addend information, or minuend and subtrahend information, to generate a second plurality of carries or borrows simultaneously.

Still a further object of this invention is to provide means for switching from either a borrow or carry system to the other.

These and other objects of this invention will become more apparent in connection with the following drawings of which, FIGURE 1 is a representation of one embodiment of the system for logically processing carry information, including one embodiment of a summer with which the system may be used.

FIGURE 1(*b*) is a representation of a NOR gate which may be used in embodiments of the FIGURE 1 system.

Figure 1:
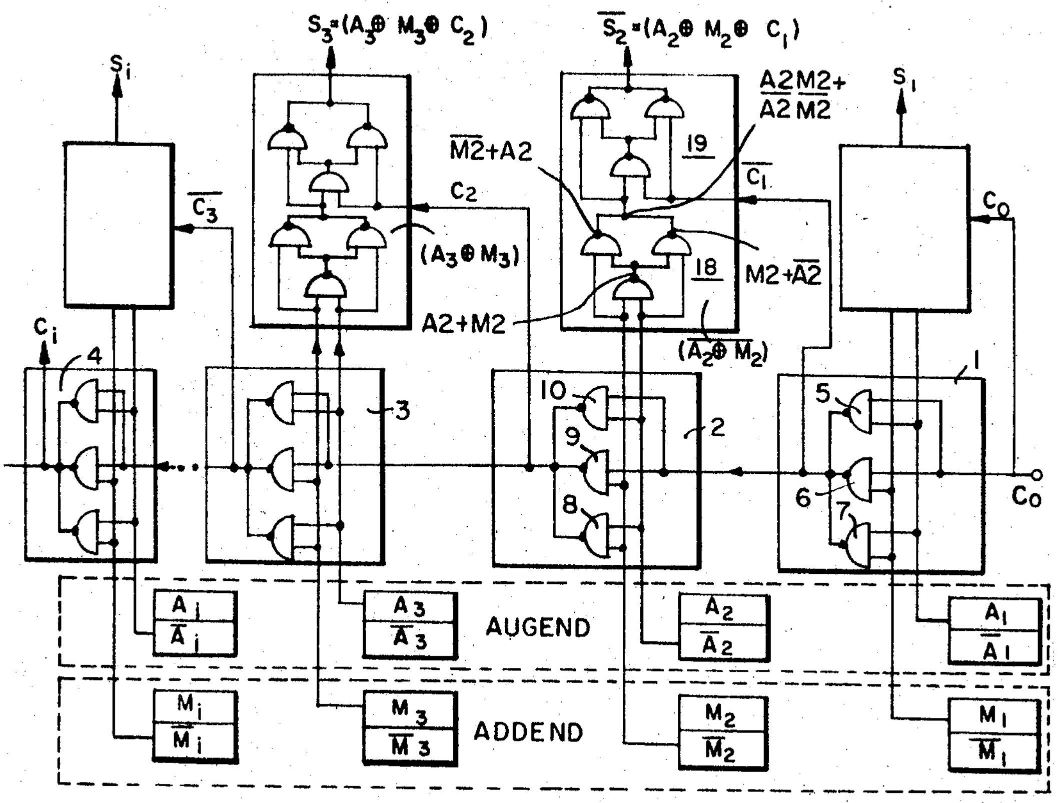
FIGURE 1(*a*) is a representation of a NAND gate which may be used in mechanizing the FIGURE 1 system.
Figure 1A:
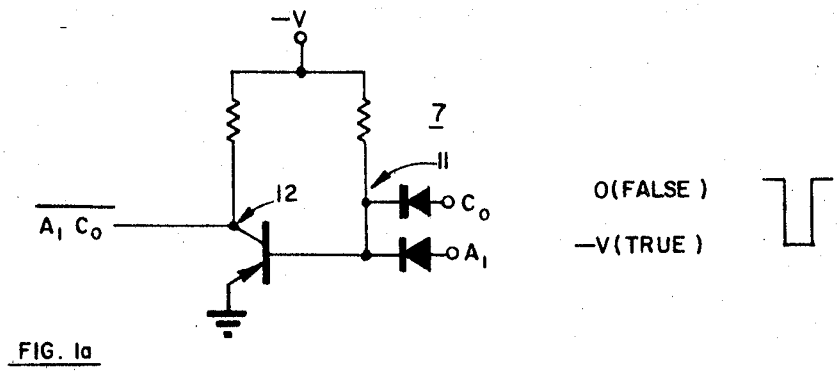
Figure 1B:
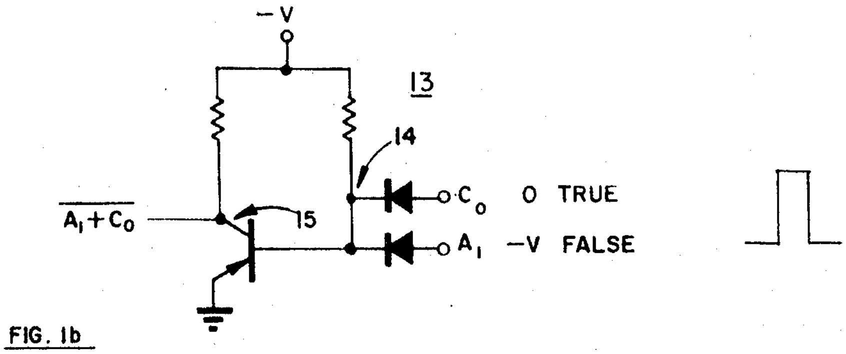

Referring now to FIGURE 1, wherein is shown one embodiment of the carry propagation system using NAND logic gates.

Flip flops $A_1$ through $A_i$ comprise a portion of a first register in a computer and hold operand bits from bit position one through *i* which are used in the computation. The flip flops generate augend and complements of augend bits. Flip flops $M_1$ through $M_i$ comprise a portion of a second register in a computer and hold operand bits from bit position one through *j* which are also used in the computation. The flip flops generate addend and complements of addend bits. Subscript 1 indicates the least significant bit position of the operand. The *i* subscript used herein, indicates a particular bit position of an operand having an indefinite number of positions.

Logic level 1, includes NAND gates 5, 6 and 7 which are connected together, or noded, for forming carry prime information, $\overline{C}_1$. Such symbol and its equivalent $C_1'$ are often used by those skilled in the art and is interpreted as meaning the condition which exists whenever $C_1$ does not. The connection produces a logical "and" function. Obviously, the connections could be made directly to the NAND gates of the succeeding logic level. The logic mechanized by gates 5, 6 and 7 for forming, or producing, $\overline{C}_1$ is, $$\overline{C}_1 = A_1M_1 + C_0A_1 + C_0M_1 = (A_1M_1)\cdot(C_0A_1)\cdot(\overline{C_0M_1})$$

where $C_0$ represents the carry information which may have been formed as a result of or produced by a previous computation and $A_1$, $M_1$ represent bits from the first bit position of each operand respectively, that is, augend and addend bits produced by flip flops $A_1$ and $M_1$. $C_0$ may be comprised of more than one term or it may be comprised of a single term.

In the FIGURE 1 embodiment, carry information, $C_0$, is nanded with the operand bits $A_1$ and $M_1$ in NAND gates 5 and 6 respectively. If either of the operand bits is true the carry information contained in the carry ($C_0$) is gated or passed into the next order as part of the carry information from the present order. In other words, the logical effect of the information, $C_0$, is passed as a function of the state of the operand bits $A_1$, $M_1$, associated with the present order.

At the same time, carry information may be generated at the present order by nanding $A_1$, $M_1$ in gate 7. If both are true, new carry information, usually comprising a single term, is generated and propagated into the next order, as part of the carry information, $\overline{C}_1$, from the present order. The new information is generated as a function of the operand bits associated with the present order.

The carry prime information, $\overline{C}_1$, formed by logic order 1 is propagated into logic order 2 and combined with complements of augend, addend and operand bits of the second bit position for producing second carry information, $C_2$. Logic order 2 is comprised of NAND gates 8, 9, and 10 which may be connected together as previously indicated in connection with logic order 1.

Ordinarily, $\overline{C}_1$ would not have been used in the second stage, but would be changed to $C_1$ by adding an inverter. An inverter, as can be observed, is not necessary herein.

Alternate logic levels or orders utilize the complemented inputs to produce carry information. The other orders utilize the uncomplemented inputs to produce the prime of carry information. Carry information as well as the complements of carry information may be used in an arithmetic summer comprising a portion of the computational system.

One example of an arithmetic summer which can be used with the borrow and carry systems described herein, is shown in FIGURE 1 as comprising summer portion associated with each bit position including summer $S_2$ associated with the operand bit position $A_2$ $M_2$, comprising half adder 18 and half adder 19. The output from the NAND gates comprising half adder 18 is the "exclusive or prime" of the inputs thereto, $\overline{A}_2$, $\overline{M}_2$. The "exclusive or" is often written "⊕." The output from the NAND gates comprising half adder 19 is the "exclusive or prime" of the inputs to that half adder $$\overline{A_2 \oplus M_2},\ C_1$$

Summer $S_3$ associated with operand bit positions $A_3$ $M_3$, has the output of $(A_3 \oplus M_3 \oplus C_2)$. Other summers $S_1$, and $S_j$, have similarly determined outputs. The various sums, $S_1$ through $S_j$, may be, for example, stored in memory locations for later use, may be used as inputs to arithmetic registers, or may be used by other systems or sub-systems within the computational system (not shown).

The logic equation mechanized by gates 8, 9 and 10 for producing carry information $C_2$ is, $$C_2 = \overline{\overline{A}_2\,\overline{M}_2 + \overline{C}_1\,\overline{M}_2 + \overline{C}_1\,\overline{A}_2} = (\overline{\overline{A}_2\,\overline{M}_2})\cdot(\overline{\overline{C}_1\,\overline{M}_2})\cdot(\overline{\overline{C}_1\,\overline{A}_2})$$

where $\overline{A}_2$ and $\overline{M}_2$ represent complements of the bits from the second augend and addend operand bit position generated by flip flops $A_2$ and $M_2$. As shown by the logic equation, $C_2$ is comprised of the carry information propagated from the first logic level and the carry information ($\overline{A}_2$ $\overline{M}_2$) generated by the second logic level.

Successive complemented carry information, including $\overline{C}_3$ from logic level 3 as well as successive carry information, $C_{i+1}$ are produced and propagated by subsequent orders according to the following generalized equations, $$\overline{C_i = A_iM_i + C_{i-1}A_i + C_{i-1}M_i}$$

$$C_{i+1} = \overline{\overline{A}_{i+1}\,\overline{M}_{i+1} + \overline{C}_i\,\overline{A}_{i+1} + \overline{C}_i\,\overline{M}_{i+1}}$$

where *i* is 1, 3, 5 . . . $C_i$ is produced by the logic level identified by numeral 4.

FIGURE 1(*a*) illustrates one embodiment of NAND gate 7 comprising diode "and" gate 11 driving inverting transistor amplifier 12. In effect, gate 11 "ands" $C_0$ and $A_1$ and transistor 12 negatives the anded combination to form a NAND combination, or not and, $$(\overline{A_1C_0})$$

FIGURE 1(*b*) illustrates one embodiment of a NOR gate 13 comprising diode "or" gate 14 driving inverting transistor amplifier 15. In effect, gate 13 "ors" $C_0$ and $A_1$ and transistor 15 negatives the "or'd" combination to form a NOR combination, or not "or,"

$$(\overline{A_1+C_0})$$

In the event NOR gates instead of the NAND gates are used, the logical equation used herein is changed, although the final equation is equivalent to the equation for a NAND gate combination. For example, the $\overline{C}_1$ equation would be, $$C_1=(\overline{\overline{A_1}+\overline{M_1}})+(\overline{\overline{C_0}+\overline{A_1}})+(\overline{\overline{C_0}+\overline{M_1}})=A_1M_1+C_0A_1+C_0M$$

Figure 2:
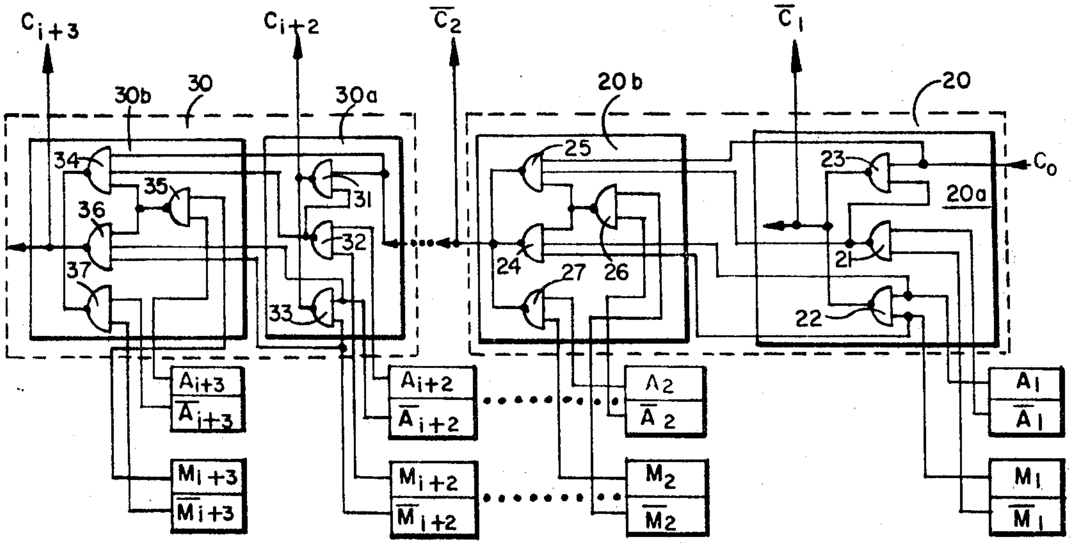
FIGURE 2 is a representation of a second embodiment of the system for logically processing carry information across a group of orders.

Referring now to FIGURE 2, wherein is shown a second embodiment of the system for increasing the carry propagation speed by producing carry information from a plurality of orders, or groups, simultaneously.

The second embodiment can be utilized to reduce the total propagation time to approximately one-half the time of propagating carry information in the FIGURE 1 embodiment, because the number of logic orders between input and output of carry information is reduced by one-half. In other words, two logic orders were required in the FIGURE 1 embodiment to produce, or form, $C_2$ carry information. In the FIGURE 2 embodiment, only one logic order is required to produce $\overline{C}_2$ at the same time $\overline{C}_1$ is being produced by a previous order comprising the grouping.

Even though the embodiment is shown as forming carry information two bits at a time, a system could be mechanized to propagate a carry across *n* number of orders by appropriate additions of logic gates. Each time carry information is propagated across an additional logic order within a logical group, such as $20_a$ and $20_b$, shown in FIGURE 2, additional gates must be added to propagate the carries from the lower order within the group.

Logic group 20 is comprised of two orders, logic $\mathbf{20_a}$ and $\mathbf{20_b}$, each including a plurality of NAND gates. Instead of first producing $\overline{C}_1$ in $\mathbf{20_a}$ and propagating that carry information into the next order, $\mathbf{20_b}$ carry information, $\overline{C}_2$, is produced directly by the addition of extra NAND gate 24. Outputs from flip flops $A_1$ and $M_1$ are nanded together in gate 22. Outputs $\overline{M}_1$ and $\overline{A}_1$ are nanded together in gate 21. NAND gate 23 has as its input carry information from a previous order, $C_0$, and the output from gate 21, $$\overline{\overline{A_1}\,\overline{M_1}}$$

The output from gates 22 and 23 are connected together to form $\overline{C}_1$. $\overline{C}_1$ may be used by a summer (not shown) or by some other part of the system. A summer similar to the one described in connection with FIGURE 1 may be used with the FIGURE 2 embodiment.

The equation mechanized by logic $\mathbf{20_a}$ for forming $\overline{C}_1$ information is, $$C_1=\overline{A_1M_1+C_0(A_1+M_1)}$$

Logic $\mathbf{20_b}$ is comprised of NAND gates 24, 25, 26 and 27. Gates 26 and 27 nand together $\overline{A}_2$ $\overline{M}_2$ and $A_2$ $M_2$ respectively. Gate 25 nands together the outputs from gate 26, $$\overline{\overline{A_2}\,\overline{M_2}}$$

without $C_0$ and the output from gate 21, $$\overline{\overline{A_1}\,\overline{M_1}}$$

$C_0$ is connected directly with gate 25 without being delayed through logic $\mathbf{20_a}$. NAND gate 24 includes as its input the output from gate 26 and $A_1$ $M_1$ connected directly from flip flops $A_1$ and $M_1$ without delay through $\mathbf{20_a}$. Outputs from gates 24, 25 and 27 are connected together to form carry information $\overline{C}_2$ which is being formed at approximately the same time as $\overline{C}_1$. As a result of making direct logical connections into order $\mathbf{20_b}$ and by virtue of an additional gate, $\overline{C}_2$ information was produced from $C_0$ with only one level of logic. That is, the level comprising gates 24, 25 and 27.

The equation mechanized by logic $\mathbf{20_b}$ for providing $\overline{C}_2$ is, $$\overline{C_2}=\overline{A_2M_2+A_1M_1(A_2+M_2)+C_0(A_1+M_1)(A_2+M_2)}$$

In the FIGURE 2 embodiment, the previously produced carry information, $C_0$, is nanded with the operand bits from the first bit position, $A_1$, $M_1$, and is nanded at the same time with operand bits associated with the present level, $A_2$ $M_2$. The carry information, $C_0$, is gated or passed through if one of $A_1$ or $M_1$ is true and if one of $A_2$ or $M_2$ is true. In other words, the logical effect of the carry information is passed as a function of the state of the operand bits from the present as well as from the next preceding logical level.

Inasmuch as a single level is involved in forming the carry information, $\overline{C}_2$, two bits at a time, the operand bits from the previous level, $A_1$ $M_1$, must be nanded in the present level for generating the carry information which would otherwise have been generated in the previous level.

The operand bits from the previous level are nanded with the nand combination of $\overline{A}_2$ $\overline{M}_2$. In other words, if both operand bits from the previous level are true, thereby generating a one carry, and if either of the operand bits of the present level are true, the carry which would have been generated in the previous level is passed on to the next level. At the same time that the above passing or not passing is occurring and also in the same single logical level, $A_2$ $M_2$ is nanded to generate carry information from the present level. In other words, if $A_2$ and $M_2$ are true, a carry of one is indicated, hence $\overline{C}_2$ is false.

If carry information is passed over *n* levels or orders at a time, as when forming carry information, *n* bits at a time, gating means such as described in connection with FIGURE 2 for passing or not passing the carry information from the previous levels, are required. In effect, the operand bits and the last formed carry information are logically combined so that the same carry information results as would have resulted if *n* levels had not been passed over. The operation is similar to that described in connection with FIGURE 2 except that more operand bits are involved.

Logic 30 is shown as illustrating another operand bit position of the carry system. Other positions between logic 20 and 30 have been omitted for convenience. It should be understood that any number of orders in addition to the orders shown for 30 and between 20 and 30 may be included in a particular system.

The first order $\mathbf{30_a}$ comprises gates 31, 32 and 33 having inputs from flip flops $A_{i+1}$ and $M_{i+1}$ from a previous logical level or order. The equation mechanized by logic $\mathbf{30_a}$ for producing or forming $C_{i+2}$ information is, $$C_{i+2}=\overline{\overline{A_{i+2}}\,\overline{M_{i+2}}+\overline{C_{i+1}}\,(\overline{A_{i+2}}+\overline{M_{i+2}})}$$

where *i* may be 1, 5, 9 . . . .

Order $\mathbf{30_b}$ is comprised of gates 34, 35, 36 and 37 having inputs from flip flops $A_{i+3}$ and $M_{i+3}$, from order $\mathbf{30_a}$ and from a previous logical order. The equation mechanized by logic $\mathbf{30_b}$ for producing $C_{i+3}$ information is, $$C_{i+3}=\overline{\overline{A_{i+3}}\,\overline{M_{i+3}}+\overline{A_{i+2}}\,\overline{M_{i+2}}\,(\overline{A_{i+3}}+\overline{M_{i+3}})+\overline{C_{i+1}}\,(\overline{A_{i+2}}+\overline{M_{i+2}})\,(\overline{A_{i+3}}+\overline{M_{i+3}})}$$

where *i* may be 1, 5, 9 . . . .

Figure 3:
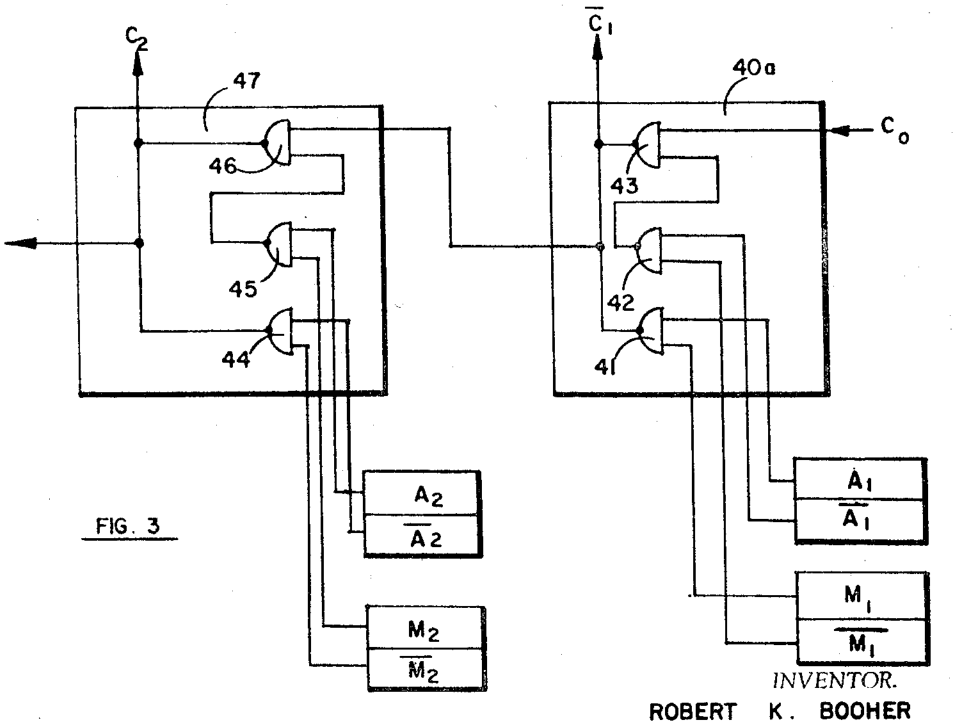
FIGURE 3 is a representation of a third embodiment of the system for logically processing carry information.

Referring now to FIGURE 3, wherein is shown a third embodiment of the system for forming carry information. As shown in the figure, the first logical order or level 40 corresponding to the first bits of the augend and addend operand generated by $A_1$ and $M_1$, is comprised of NAND gates 41, 42 and 43.

The operation and logic connections of the gate are substantially the same as the FIGURE 1 embodiment. In the FIGURE 1 embodiment, the $A_1$ bit was nanded with the $C_0$ information, the $M_1$ bit was nanded with the $C_0$ information; and the $A_1$ and $M_1$ bits were nanded together to form $\overline{C}_1$. In the FIGURE 3 embodiment, $\overline{A}_1$ and $\overline{M}_1$ are nanded to form $(A_1+M_1)$ which is then nanded with $C_0$ to form $$\overline{(A_1+M_1)C_0}$$

which can also be written $$\overline{(A_1C_0)}\cdot\overline{(M_1C_0)}$$

The noded output from gates 43 and 41 form $\overline{C}_1$. The following equation is mechanized by the FIGURE 3 embodiment, $$\overline{C_1}=\overline{C_0(A_1+M_1)\cdot(A_1+M_1)}$$

The second level, 47, corresponding to the second operand bits of the augend and addend operands is comprised of gates 44, 45 and 46. The following equation is mechanized by the second logic level, $$C_2=\overline{\overline{C_1}\,\overline{(A_2+M_2)}+\overline{A_2}\,\overline{M_2}}$$

It should be obvious, that the logic levels of the FIGURE 2 system could be implemented with logic substantially similar to the logic of the logic levels shown in FIGURE 1.

Figure 4:
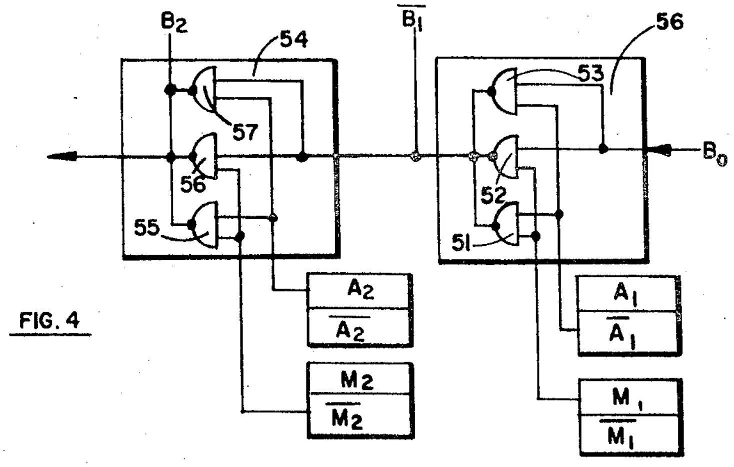
FIGURE 4 is a representation of a fourth embodiment of the system for logically processing borrow information.

Referring now to FIGURE 4, wherein is shown one embodiment of a system for logically forming borrow information. In effect, all that is necessary for converting the FIGURES 1, 2 and 3 carry system embodiments into borrow systems is to reverse the inputs from the A flip flops. In other words, since a borrow is generated when the subtrahend is 1 ($M_1$) and the complement of the minuend ($\overline{A}_1$) is 1, and since a borrow is passed when the subtrahend is 1 ($M_1$) or when the complement of the minuend ($\overline{A}_1$) is 1, by changing the A flip flops inputs into the various logic levels, an addition system is converted into a subtraction system. For example, in order to convert the FIGURE 1 system into the borrow system of FIGURE 4, the inputs from the augend operand were reversed from $A_1$ to $\overline{A}_1$. In the FIGURE 4 embodiment, M represents the subtrahend and $A_1$ represents the minuend.

The borrow system is comprised of logic 50 having gates 51, 52 and 53. Inputs from $\overline{A}_1$ and $M_1$, representing the first bits of the minuend and subtrahend operands, are nanded in gate 51 and individually nanded with $B_0$, representing a borrow from a previous order, in gates 52 and 53 respectively.

The noded gate output forms borrow information $\overline{B}_1$.

The logic mechanized by the embodiment is, $$\overline{B_1}=\overline{\overline{A_1}M_1+B_0\overline{A_1}+B_0M_1}$$

In operation, $B_0$ is passed or gated through the single level if $\overline{A}_1$ or $M_1$ are true and a new borrow is generated by the single level if $\overline{A}_1$ and $M_1$ are true. For example, if $M_1$ is true, and $B_0$ is true, regardless of the state of $\overline{A}_1$, the output from nand gate 52 will be false so that $\overline{B}_1$ will be false. If $\overline{B}_1$ is false, then $B_1$ must be true. The same result follows when $\overline{A}_1$ is true. In addition, if $B_0$ is false and $M_1$ and $\overline{A}_1$ are true, the output from nand gate 51 will be false so that $\overline{B}_1$ will be false and $B_1$ will be true thereby indicating the generation of a new borrow.

The same result would follow if $A_1\,\overline{M}_1$ were first nanded in, for example, gate 52 to form $(\overline{A}_1+M_1)$ and subsequently nanded with $B_0$ in gate 53.

The second order, 54, is comprised of NAND gates 55, 56 and 57. Minuend and subtrahend bits from the second bit position of the operands are nanded together in NAND gate 55 and are individually nanded with $\overline{B}_1$ in gate 56 and 57 respectively.

The outputs are connected together to form $B_2$.

The logic mechanized by the embodiment is, $$B_2=\overline{A_2\overline{M_2}+\overline{B_1}\,\overline{M_2}+\overline{B_1}A_2}$$

As indicated in connection with the carry embodiment, it may not be necessary to node or connect the outputs together. The outputs may be connected directly into a subsequent logical level.

Even though an embodiment for logically processing or producing $n$ borrow bits at a time is not described herein, it should be obvious that the FIGURE 2 embodiment for a carry system could be converted into a borrow system by making the changes suggested in connection with FIGURE 4. In other words, the inputs from the A flip flops could be reversed.

Figure 5:
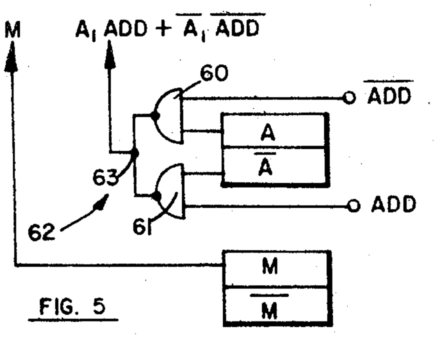
FIGURE 5 is a representation of a gating system providing means for changing a system from either a carry or borrow system to the other.

In certain systems, it may be desirable to operate a system in either a borrow or carry mode. In FIGURE 5, one embodiment of a system is shown which permits operation of a system such as described in connection with FIGURES 1, 2, 3 and 4 as either a borrow or carry system.

Since the only change necessary to convert a carry system to a borrow system is the reversal of the inputs from the A flip flop, NAND gates 60 and 61 comprising selection logic 62, are inserted between an A flip flop (e.g. $A_1$), and the logic level associated therewith (not shown). Similar gates may be inserted between A flip flops and the logic levels associated therewith. The selection logic is comprised of a single logical order.

When a carry system is required, add is true, $\overline{\text{add}}$ is false and gate 60 is open. The output 63 is from the primed side of the A flip flop (e.g. $\overline{A}_1$). However, since it is nanded in gate 61 it becomes A at the output.

If a borrow system is required, add is false, $\overline{\text{add}}$ is true true and gate 61 is open. The output 63 is from the unprimed side of the A flip flop (e.g. $A_1$). However, since it is nanded in gate 60, it becomes $\overline{A}$ at the output.

Logic mechanized by the FIGURE 5 embodiment is, $$A_1\,\text{Add}+\overline{A_1}\,\overline{\text{Add}}=\overline{\overline{A_1}\,\text{add}+A_1\,\overline{\text{add}}}=\overline{(\overline{A_1}\,\text{add})}\cdot\overline{(A_1\,\overline{\text{add}})}$$

where add is associated with the carry selection and $\overline{\text{add}}$ is associated with the borrow selection.

Although the invention has been described and illustrated in detail, it is to be understood that the same is by way of illustration and example only, and is not to be taken by way of limitation; the spirit and scope of this invention.

I claim:

1. Means including logic groups for performing arithmetic operations resulting in carry or borrow information produced by the logic groups each comprising at least two logic orders representing consecutive operand bit positions, said means comprising means for producing borrow or carry information in alternate groups and the primes of the borrow or carry information in the remaining groups, said information being produced from the last one of the logic orders in each group in a propagation time of one bit, and means for performing said arithmetic operations in response to said carry or borrow information in alternate groups and in response to the prime of said borrow or carry information in the remaining groups.

2. The combination recited in claim 1 including gating means having inputs thereto for logically inverting the operand bits of a selected operand bit position in response to said inputs for changing said logic groups from logic groups producing one of borrow or carry information to logic groups producing the other of said borrow or carry information.

References Cited

UNITED STATES PATENTS

| | | | |
|---|---|---|---|
| 3,075,093 | 1/1963 | Boyle | 235—176 X |
| 3,100,837 | 8/1963 | Gesek | 235—175 |
| 3,125,675 | 3/1964 | Jeeves | 235—175 |
| 3,234,371 | 2/1966 | Osofsky | 235—175 |
| 3,249,747 | 5/1966 | Booher | 235—175 |
| 3,407,357 | 10/1968 | Spandorfer et al. | 235—176 X |

(Other references on following page)

FOREIGN PATENTS 981,922 1/1965 Great Britain.

OTHER REFERENCES

"Synthesis of Electronic Computing and Control Circuits" by the Staff of the Computation Laboratory, Cambridge, Mass., Harvard University Press (1951) TK 7870 H3.

EUGENE G. BOTZ, Primary Examiner

U.S. Cl. X.R.

235—176